(12) United States Patent
Chung et al.

(10) Patent No.: US 12,465,284 B2
(45) Date of Patent: Nov. 11, 2025

(54) MULTI-SENSOR INTOXICATION DETECTION

(71) Applicant: MAGNA ELECTRONICS, LLC, Southfield, MI (US)

(72) Inventors: Caroline Chung, Royal Oak, MI (US); Thomas Herbert, Fenton, MI (US)

(73) Assignee: MAGNA ELECTRONICS, LLC, Southfield, MI (US)

( * ) Notice: Subject to any disclaimer, the term of this patent is extended or adjusted under 35 U.S.C. 154(b) by 416 days.

(21) Appl. No.: 18/117,081

(22) Filed: Mar. 3, 2023

(65) Prior Publication Data
US 2024/0293079 A1    Sep. 5, 2024

(51) Int. Cl.
*A61B 5/00* (2006.01)
*A61B 3/11* (2006.01)
(Continued)

(52) U.S. Cl.
CPC ............ *A61B 5/4845* (2013.01); *A61B 3/112* (2013.01); *A61B 5/0077* (2013.01); *A61B 5/0205* (2013.01); *A61B 5/05* (2013.01); *A61B 5/4561* (2013.01); *A61B 5/6893* (2013.01); *G01N 21/3504* (2013.01); *G01N 33/4972* (2013.01);
(Continued)

(58) Field of Classification Search
CPC ..... A61B 5/4845; A61B 5/082; A61B 5/6893; A61B 2503/22; A61B 5/18; G01N 33/4972

See application file for complete search history.

(56) References Cited

U.S. PATENT DOCUMENTS

| 11,554,665 B1 | 1/2023 | Liu et al. |
| 2009/0090577 A1* | 4/2009 | Takahashi .......... G01N 33/4972 340/576 |

(Continued)

FOREIGN PATENT DOCUMENTS

| CN | 106828097 A | 6/2017 |
| CN | 112674721 A | 4/2021 |

(Continued)

OTHER PUBLICATIONS

International Search Report and Written Opinion for International Application No. PCT/US2023/084581 mailed Apr. 3, 2024.

*Primary Examiner* — Thomas S McCormack

(57) ABSTRACT

An intoxication detection system of a vehicle includes: a passive breath sensor configured to measure an amount of an intoxicant present within a passenger cabin; a camera configured to capture images including a driver on a driver's seat within the passenger cabin; a radar sensor configured to output radar signals toward the driver's seat and receive signals reflected back to the radar sensor; a baseline module configured to determine baseline parameters for the driver based on images from the camera and the signals received by the radar sensor; and an intoxication indication module configured to output an indicator that the driver is intoxicated when both (a) the amount of the intoxicant is greater than or equal to a predetermined amount and (b) at least one present parameter of the driver is different than a respective one of the baseline parameters for the driver by at least a predetermined amount.

20 Claims, 5 Drawing Sheets

(51) Int. Cl.

| | | |
|---|---|---|
| *A61B 5/0205* | (2006.01) | |
| *A61B 5/024* | (2006.01) | |
| *A61B 5/05* | (2021.01) | |
| *A61B 5/08* | (2006.01) | |
| *G01N 21/3504* | (2014.01) | |
| *G01N 33/497* | (2006.01) | |
| *G06V 40/16* | (2022.01) | |

(52) U.S. Cl.
CPC .......... *G06V 40/161* (2022.01); *G06V 40/174* (2022.01); *A61B 5/02444* (2013.01); *A61B 5/0816* (2013.01); *A61B 2503/22* (2013.01)

(56) References Cited

U.S. PATENT DOCUMENTS

| | | | |
|---|---|---|---|
| 2013/0070043 A1* | 3/2013 | Geva | ........................ A61B 5/18 |
| | | | 348/14.02 |
| 2017/0274768 A1* | 9/2017 | Hök | ................... G01N 33/4972 |
| 2019/0113502 A1* | 4/2019 | Ruland | ................ B60K 28/063 |
| 2021/0148892 A1 | 5/2021 | Ruland et al. | |
| 2022/0055478 A1 | 2/2022 | Hök et al. | |

FOREIGN PATENT DOCUMENTS

| | | |
|---|---|---|
| CN | 114611602 A | 6/2022 |
| WO | WO-2004018249 A1 | 3/2004 |
| WO | WO-2022134780 A1 | 6/2022 |

\* cited by examiner

MULTI-SENSOR INTOXICATION DETECTION

FIELD

The present disclosure relates to in passenger cabin monitoring systems and methods for vehicles and more particularly to in passenger cabin detection of intoxication using multiple different inputs.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles can be used for individual use (e.g., by the same one or more people) or for shared use by many different people. Rideshare systems allow users to request transportation from a pick-up location to a drop-off location.

Vehicles may be human-operated or autonomous vehicles (e.g., cars, vans, buses, bicycles, motorcycles, etc.). Examples of autonomous vehicles include semi-autonomous and fully autonomous vehicles. Human operated vehicles are controlled by a human using input devices, such as a steering wheel, an accelerator pedal, and a brake pedal.

SUMMARY

In a feature, an intoxication detection system of a vehicle includes: a passive breath sensor configured to measure an amount of an intoxicant present within a passenger cabin of the vehicle; a camera configured to capture images including a driver on a driver's seat within the passenger cabin of the vehicle; a radar sensor configured to output radar signals toward the driver's seat and receive signals reflected back to the radar sensor; a baseline module configured to determine baseline parameters for the driver based on images from the camera and the signals received by the radar sensor; and an intoxication indication module configured to output an indicator that the driver is intoxicated when both (a) the amount of the intoxicant is greater than or equal to a predetermined amount of the intoxicant and (b) at least one present parameter of the driver is different than a respective one of the baseline parameters for the driver by at least a predetermined amount.

In further features, the intoxication indication module is configured to output the indicator that the driver is intoxicated when both (a) the amount of the intoxicant is greater than or equal to the predetermined amount of the intoxicant and (b) a present heart rate of the driver is greater than a baseline heart rate for the driver by at least a predetermined amount.

In further features, a parameter module is configured to determine the present heart rate of the driver based on the signals received by the radar sensor.

In further features, the intoxication indication module is configured to output the indicator that the driver is intoxicated when both (a) the amount of the intoxicant is greater than or equal to the predetermined amount of the intoxicant and (b) a present breathing rate of the driver is greater than a baseline breathing rate for the driver by at least a predetermined amount.

In further features, a parameter module is configured to determine the present breathing rate of the driver based on the signals received by the radar sensor.

In further features, the intoxication indication module is configured to output the indicator that the driver is intoxicated when both (a) the amount of the intoxicant is greater than or equal to the predetermined amount of the intoxicant and (b) a present body pose of the driver is different than a baseline body pose for the driver by at least a predetermined difference.

In further features, a body detection module is configured to determine the present body pose of the driver based on an image from the camera.

In further features, the intoxication indication module is configured to output the indicator that the driver is intoxicated when both (a) the amount of the intoxicant is greater than or equal to the predetermined amount of the intoxicant and (b) a present pose of a face of the driver is different than a baseline face pose for the driver by at least a predetermined difference.

In further features, a face detection module is configured to determine the present pose of the face of the driver based on an image from the camera.

In further features, the intoxication indication module is configured to output the indicator that the driver is intoxicated when both (a) the amount of the intoxicant is greater than or equal to the predetermined amount of the intoxicant and (b) a present dimension of a pupil of an eye of the driver is greater than a baseline pupil dimension for the driver by at least a predetermined amount.

In further features, an eye detection module is configured to determine the present dimension of the pupil of the eye of the driver based on an image from the camera.

In further features, the baseline module is configured to selectively update the baseline parameters for the driver based on images from the camera and the signals received by the radar sensor when the amount of the intoxicant present within the passenger cabin of the vehicle measured by the passive breath sensor is zero.

In further features, the passive breath sensor includes a non-dispersive infrared (NDIR) sensor.

In further features, the intoxicant is alcohol.

In further features, the intoxication indication module is further configured to selectively output an indicator that the driver is not intoxicated when both the amount of the intoxicant is less than the predetermined amount of the intoxicant.

In further features, the intoxication indication module is configured to not output the indicator that the driver is not intoxicated when a second face is detected in an image from the camera within a predetermined distance of the passive breath sensor.

In further features, the intoxication indication module is configured to not output the indicator that the driver is not intoxicated when an object having a predetermined shape is detected in a mouth of the driver in an image from the camera.

In further features, the predetermined shape is cylindrical.

In further features, the intoxication indication module is configured to not output the indicator that the driver is not intoxicated when the driver is determined to be holding his or her breath.

In a feature, an intoxication detection method for a vehicle includes: by a passive breath sensor, measuring an amount of an intoxicant present within a passenger cabin of the vehicle; capturing images including a driver on a driver's seat within the passenger cabin of the vehicle using a camera; by a radar sensor, outputting radar signals toward the driver's seat and receiving signals reflected back to the radar sensor; determining parameters for the driver based on images from the camera and the signals received by the radar sensor; and outputting an indicator that the driver is intoxicated when both (a) the amount of the intoxicant is greater than or equal to a predetermined amount of the intoxicant and (b) at least one present parameter of the driver is different than a respective one of the baseline parameters for the driver by at least a predetermined amount.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some drivers may attempt to drive vehicles while intoxicated from, for example, beverages including alcohol or other types of drugs (e.g., marijuana). Some vehicles may include an interlock device that requires a driver to breath directly into the interlock device and for the breath to measure an alcohol concentration of less than a predetermined concentration before allowing a vehicle to start and move.

The present application involves systems and methods for detecting intoxication of a driver of a vehicle using multiple different types of inputs, such as images from a camera including images of the driver, measurements from a radar sensor measuring parameters of the driver, and measurements from a passive breath (alcohol) sensor (e.g., a non-dispersive infrared (NDIR) sensor). Passive breath sensors are different than interlock devices in that passive breath sensors do not require a user to breathe directly into passive breath sensors, while users breathe directly into interlock devices. Instead, passive breath sensors draw in air from within the passenger cabin and determine the amount of the intoxicant in the drawn in air.

The use of multiple different types of inputs can be used to identify the driver, ensure that intoxicant detected by the passive breath sensor is from exhaling of the driver and not another passenger or source and ensure that the driver is not using one or more devices (e.g., filters) to filter the intoxicant from his or her breath. This may make the measurement and intoxicant detection more accurate and reliable. Other parameters can also be used to increase an accuracy of detection that the driver is intoxicated. For example, intoxication of the driver can be identified when the amount of the intoxicant detected by the passive breath sensor is greater than or equal to a predetermined amount and at least one of: a breathing rate of the driver is higher than a baseline for the driver; a heart rate of the driver is higher than a baseline for the driver; a dimension of pupils of the driver is greater than a baseline for the driver; a body pose of the driver is different than a baseline for the driver (e.g., the driver is slouching); and a face pose of the driver is different than a baseline for the driver (e.g., the driver's face is droopy/drowsy). Other parameters can also be used to increase an accuracy of detection that the driver is not intoxicated. For example, the driver may not be deemed not intoxicated if a filter is detected in the mouth of the driver or another passenger of the vehicle is detected within a predetermined distance of the passive breath sensor. Such activities may be performed in an attempt to trick the system into determining that the driver is not intoxicated.

Figure 1:
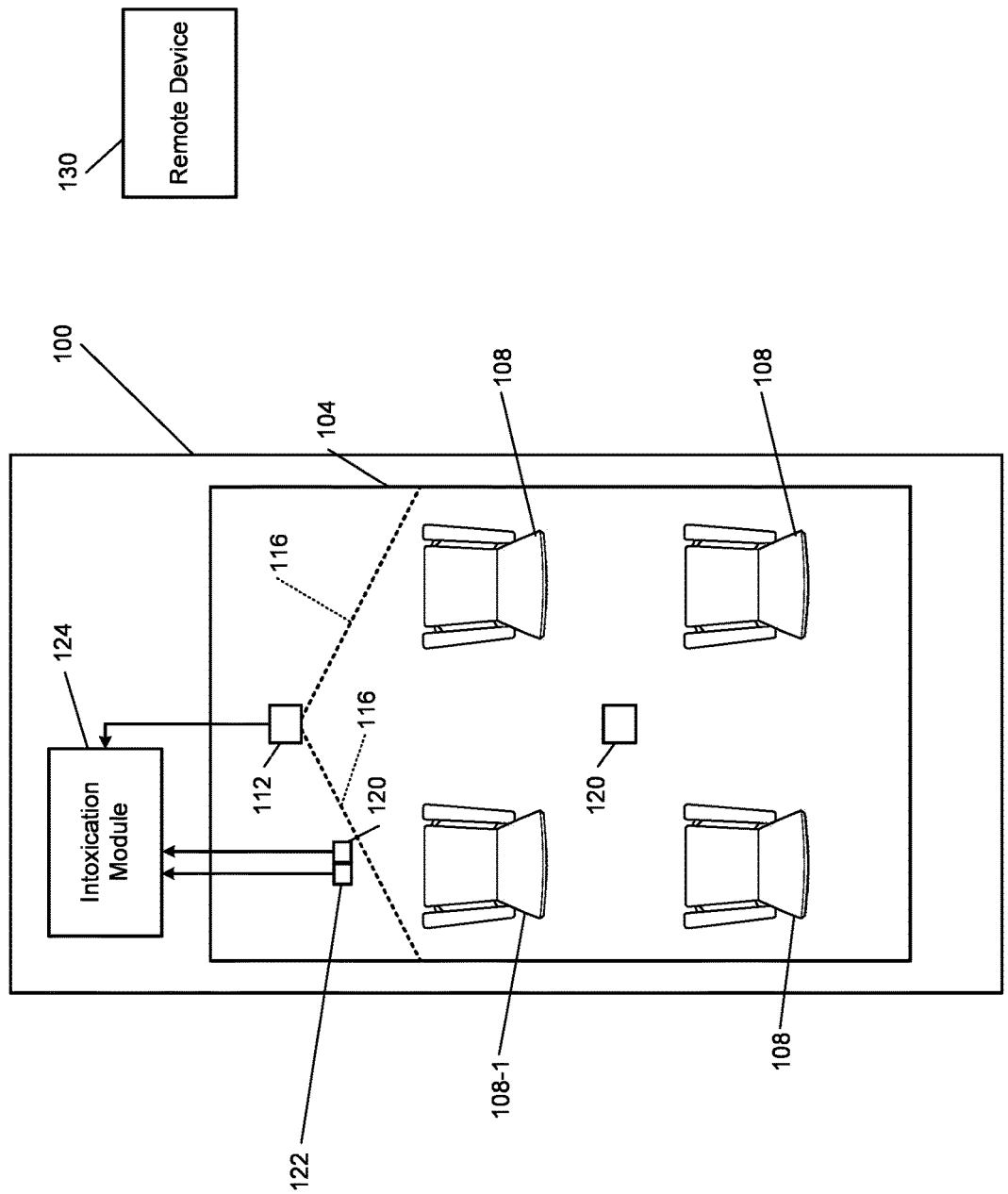
FIGS. 1-3 are functional block diagrams of example systems of a vehicle.

FIG. 1 is a functional block diagram of an example system of a vehicle 100. The vehicle 100 includes a passenger cabin 104. The vehicle 100 also includes one or more propulsion devices, such as one or more electric motors and/or an engine. The vehicle 100 may include a transmission and/or other types of gearing devices configured to transfer torque to one or more wheels of the vehicle 100 from the engine and/or the electric motor(s).

One or more seats 108 are located within the passenger cabin 104. Users of the vehicle 100 may sit on the seats 108. While the example of the vehicle 100 including four seats is provided, the present application is also applicable to greater and lesser numbers of seats. The vehicle 100 may be a sedan, a van, a truck, a coupe, a utility vehicle, boat, airplane, or another suitable type of land, air, or water based vehicle. The present application is also applicable to the vehicle 100 being a public transportation vehicle, such as a bus, a train, tram, street car, or another suitable form of public transportation.

A driver sits on a driver's seat, such as 108-1. A driver may actuate an accelerator pedal to control acceleration of the vehicle 100. The driver may actuate a brake pedal to control application of brakes of the vehicle 100. The driver may actuate a steering wheel to control steering of the vehicle 100. In various implementations, the vehicle 100 may be an autonomous vehicle or a semi-autonomous vehicle. In autonomous vehicles and semi-autonomous vehicles, acceleration, braking, and steering may be at least at times controlled by one or more control modules of the vehicle 100.

A camera 112 is disposed to capture images including eyes, heads, faces, and upper torsos of users (occupants) of the vehicle 100, such as the driver. The camera 112 has a predetermined field of view (FOV). An example FOV is illustrated by 116 in FIG. 1. The driver's seat (e.g., 108-1) is disposed within the predetermined FOV of the camera 112. One or more of the seats 108 may also be located within the predetermined FOV of the camera 112. In various implementations, the camera 112 may be disposed on the vertical top of a steering wheel.

Figure 2:
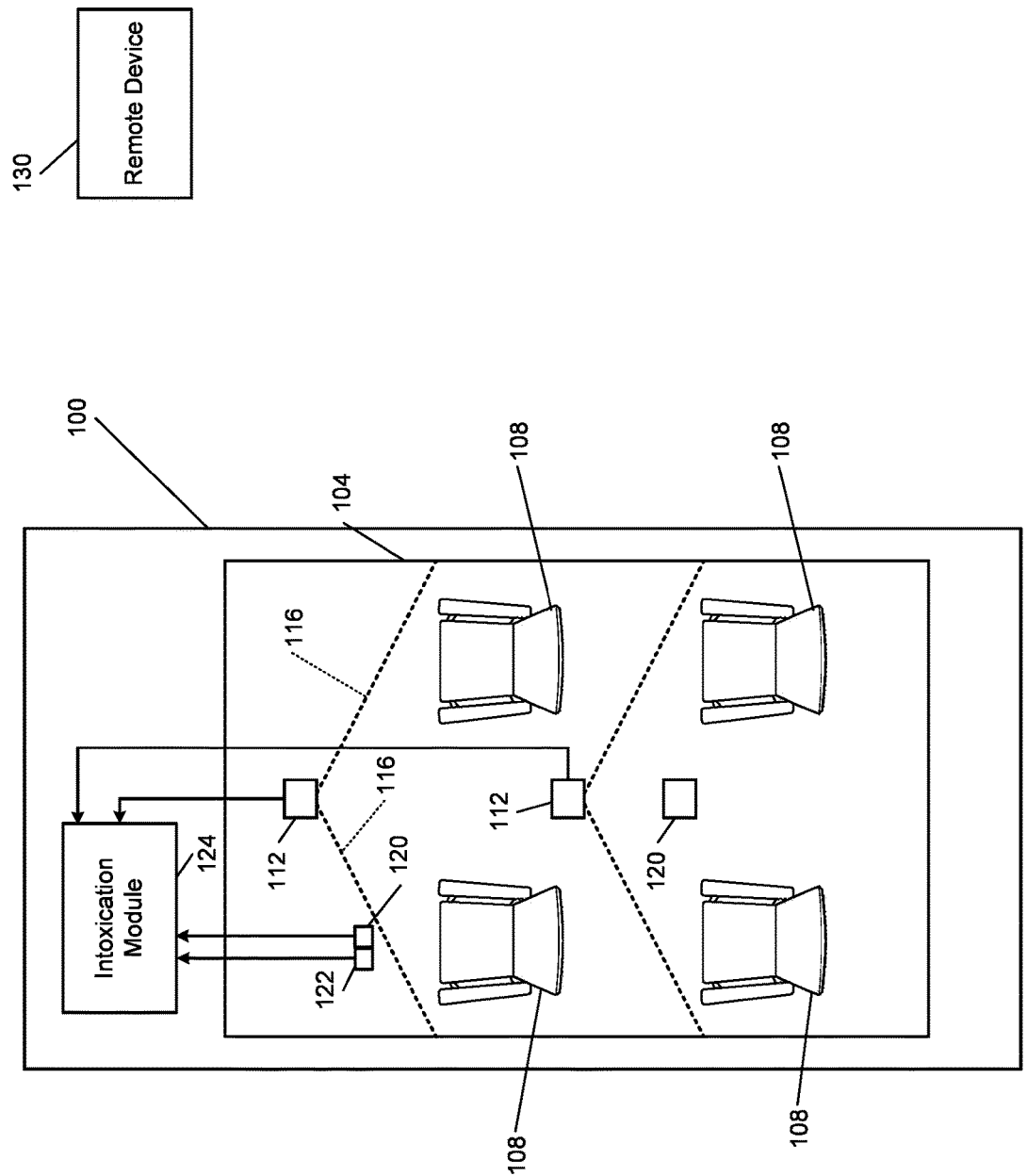
Figure 3:
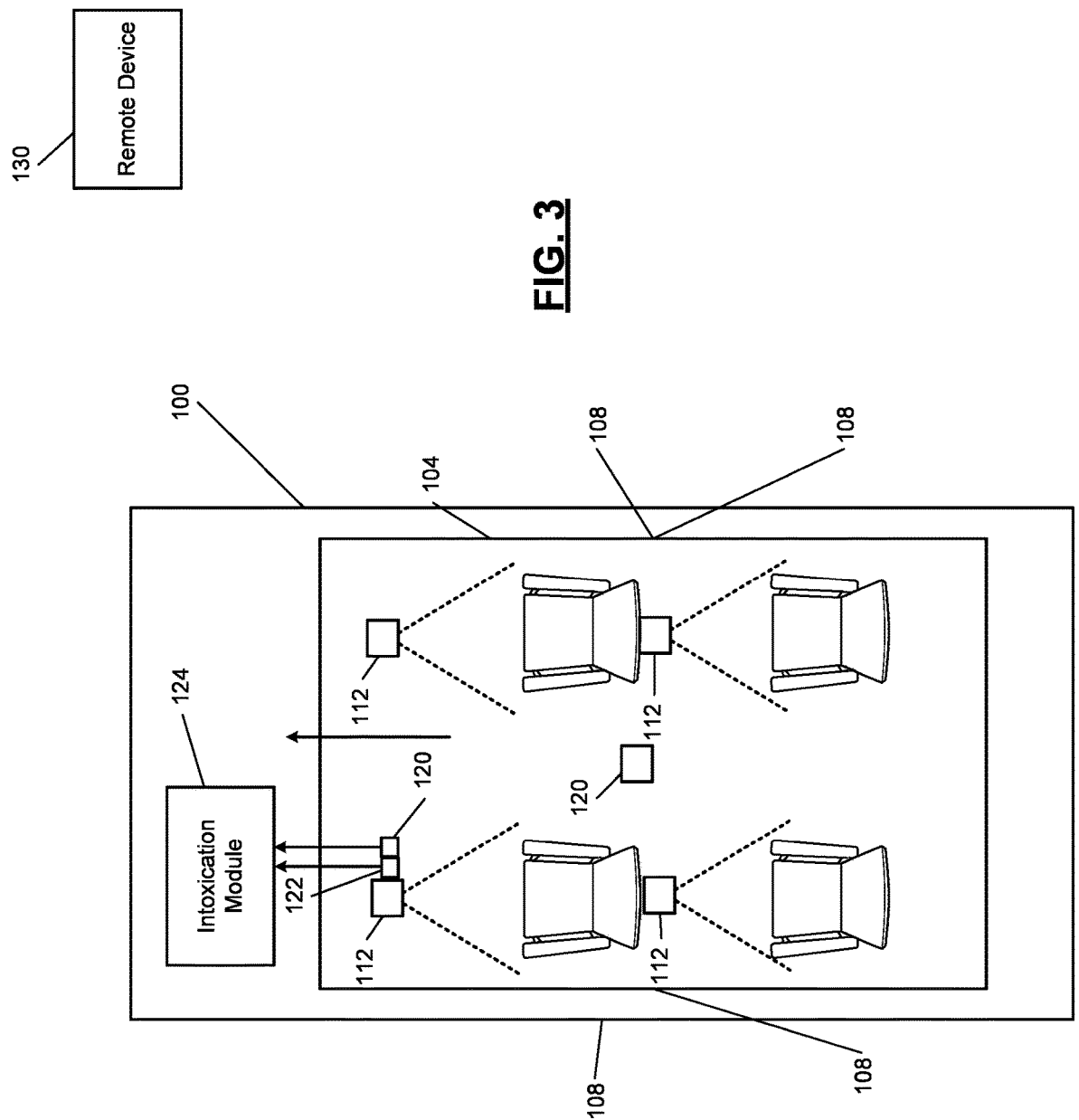

While the example of one camera is provided, one camera may capture images of users in front seats of the vehicle, and one camera may capture images of users in rear seats of the vehicle 100, such as shown in the example of FIG. 2. Alternatively, one camera may be provided per seat to capture images of users in that seat, such as shown in the example of FIG. 3.

In various implementations one or more other cameras may be included, for example, to detect and locate users, heads, faces, eyes, etc. While the example of passengers sitting in seats is provided, the present application is also applicable to passengers that are standing and in other orientations in vehicles.

One or more other types of sensors are also included. For example, a passive breath (e.g., alcohol) sensor 120 draws in air from within the passenger cabin and measures an amount (e.g., concentration) of alcohol in a sample of the air drawn in. The passive breath sensor 120 may be disposed on the steering wheel of the vehicle and within a predetermined distance (e.g., 3 feet) of the driver's seat. In various implementations, the passive breath sensor 120 may be disposed within interior trim of a door to the driver's seat.

A radar sensor 122 may also be included. The radar sensor 122 may output radar signals toward the driver's seat (e.g., 108-1) and receive signals reflected back to the radar sensor. The radar sensor 122 may determine one or more parameters of the driver (e.g., heart rate, breathing rate, exhalation) based on the received signals. The radar sensor may be, for example, a 77 gigahertz radar sensor or have another suitable frequency.

An intoxication module 124 detects intoxication of the driver by an intoxicant (e.g., alcohol) based on the measurements from the passive breath sensor 120. For example, the intoxication module 124 may detect intoxication of the driver when the measured amount (e.g., of alcohol) in a sample of air is greater than a predetermined amount. One or more actions may be taken when intoxication of the driver is detected. For example, if intoxication is detected while the vehicle is moving, the intoxication module 124 may slow the vehicle to a stop. If intoxication is detected before the vehicle is started, the intoxication module 124 may prevent startup of the vehicle. If intoxication is detected, the intoxication module 124 may transmit an indicator that the driver is intoxicated to a remote device 130. Additionally or alternatively, if intoxication is detected, the intoxication module 124 may visually and/or audibly output an indicator that the driver is intoxicated via a light (e.g., a display) and/or a speaker, such as within the passenger cabin. One or more other actions may additionally or alternatively be taken when intoxication of the driver is detected.

The passive breath sensor 120 may measure breath other than from the driver, such as from one or more other passengers of the vehicle. The driver may also take one or more actions to avoid detection of intoxication of the driver, such as breathing through a filter, encouraging a passenger to breathe into the passive breath sensor 120, etc.

The intoxication module 124 therefore determines whether the driver is intoxicated based on data from one or more other sensors, such as the radar sensor 122 and/or the camera 112. The use of data from one or more other sensors makes the detection of intoxication of the driver more accurate and robust.

Figure 4:
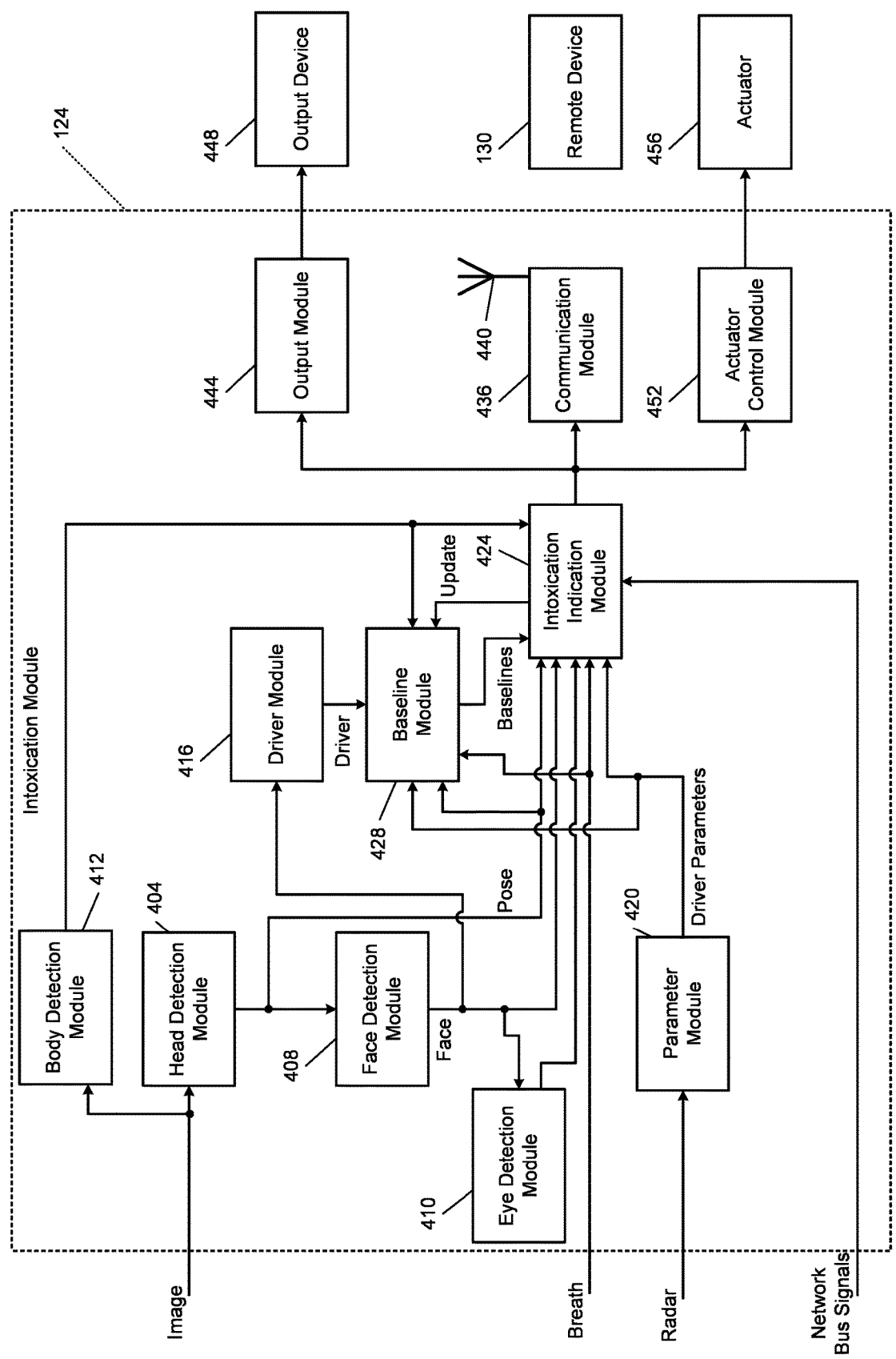
FIG. 4 is a functional block diagram of an example implementation of an intoxication detection module.

FIG. 4 is a functional block diagram of an example implementation of the intoxication module 124. A head detection module 404 receives the images from the camera 112. The camera 112 may capture images at a predetermined rate, such as 60 Hertz or at another suitable frequency.

The head detection module 404 detects a head of the driver in the image using a head detection algorithm. The head detection module 404 may detect the head, for example, using a Haar cascade, a convolutional neural network (CNN), or in another suitable manner. More specifically, the head detection module 404 determines a region of interest (ROI) or area including the head of the driver in the image. The ROI including the driver may be a rectangle of pixels including the head.

The head detection module 404 transmits the ROI of the image including the head to a face detection module 408. The face detection module 408 detects the face of the driver in the ROI including the head. More specifically, the face detection module 408 determines an ROI including the face of the driver in the ROI including the head. The ROI including the face may be a rectangle of pixels including the face of the driver. The face detection module 408 may detect the face using a face detection algorithm. For example, the face detection module 408 may detect the face of the driver using feature extraction and constraints.

The head detection module 404 may also determine a pose of the head of the driver in the image. The pose may be, for example, a mesh connecting keypoints of the head of the driver. The head detection module 404 may determine the pose of the head, for example, using a pose detection algorithm for human heads.

The face detection module 408 transmits the ROI of the image including the face to an eye detection module 410. The eye detection module 410 detects one or more of the eyes of the driver in the ROI including the face. The eye detection module 410 determines one or more ROIs including the eyes of the driver in the ROI including the face. An ROI including an eye may be a rectangle of pixels including the eye of the driver. The eye detection module 410 may detect the eyes using an eye detection algorithm. For example, the eye detection module 410 may detect the eyes of the driver using feature extraction and constraints.

In various implementations, the eye detection module 410 may detect pupils of the eyes of the driver, such as using a pupil detection algorithm. The eye detection module 410 may determine one or more characteristics of the pupils, such as diameter and location of a center of the pupil.

A body detection module 412 may also determine a pose of the body (e.g., torso) of the driver in the image. The pose may be, for example, a mesh connecting keypoints of the torso of the driver. The body detection module 412 may determine the pose of the body, for example, using a pose detection algorithm for human torsos.

A driver module 416 identifies the driver based on the face of the driver from the face detection module 408. The driver module 416 may, for example, compare the face to stored face profiles and select the one of the stored face profiles that most closely matches the face of the driver.

A parameter module 420 determines present parameters of the driver (driver parameters) based on the measurements from the radar sensor 122. For example, the parameter module 420 may determine a present heart rate of the driver based on the measurements from the radar sensor 122. The parameter module 420 may determine the heart rate, for example, using one or more equations or lookup tables that relate measurements from the radar sensor 122 to heart rates.

Additionally or alternatively, the parameter module 420 may determine a present breathing rate of the driver based on the measurements from the radar sensor 122. The parameter module 420 may determine the breathing rate, for example, using one or more equations or lookup tables that relate measurements from the radar sensor 122 to breathing rates.

Additionally or alternatively, the parameter module 420 may determine whether the driver is exhaling or not (holding his or her breath) based on the measurements from the radar sensor 122. The parameter module 420 may determine the breathing rate, for example, using one or more equations or lookup tables that relate measurements from the radar sensor 122 to breathing rates.

An intoxication indication module 424 monitors the amount of the intoxicant (e.g., alcohol) measured by the passive breath sensor 120. The intoxication indication module 424 determines and indicates whether the driver is intoxicated based on the amount of intoxicant measured by the passive breath sensor 120 and one or more other parameters, such as one or more of the driver parameters determined by the parameter module 420, one or more of the parameters determined by the body detection module 412, one or more of the parameters determined by the head detection module 404, one or more of the parameters determined by the face detection module 408, and/or one or more of the parameters determined by the eye detection module 410.

When the amount of intoxicant measured by the passive breath sensor 120 is zero of the intoxicant, the intoxication indication module 424 selectively enables a baseline module 428 to update baseline parameters for the driver. When enabled, the baseline module 428 updates baseline parameters for the driver associated with the select the one of the stored face profiles that most closely matches the face of the driver based on the present parameters of the driver determined using the images from the camera 112 and the measurements of the radar sensor 122. The baseline module 428 may also require one or more other conditions to be present to update the baseline parameters. For example, the baseline module 428 may require that network (e.g., car area network (CAN)) bus messages to indicate that no lane departures, no traffic signals have been violated, etc. to enable updating of the baseline parameters.

As an example, the baseline module 428 may determine a baseline heart rate for the driver based on the heart rate determined using the measurements from the radar sensor 122. As another example, the baseline module 428 may determine a baseline breathing rate for the driver based on the breathing rate determined using the measurements from the radar sensor 122. As an example, the baseline module 428 may determine a baseline pupil diameter for the driver based on the pupil diameter determined using an image from the camera 112. As another example, the baseline module 428 may determine a baseline body pose for the driver based on the body pose determined based on an image from the camera. As another example, the baseline module 428 may determine a baseline face pose for the driver based on the face pose determined based on an image from the camera. The baseline module 428 may determine a baseline for each parameter of the driver determined based on an image or measurements from the radar sensor 122. The baseline module 428 may determine a baseline for a parameter, for example, based on an average of the values of that parameter over a predetermined period while enabled.

When the amount of the intoxicant measured by the passive breath sensor 120 is less than a predetermined amount (e.g., 0.04 grams of the intoxicant per 210 liters of breath or another suitable value), the intoxication indication module 424 may determine and indicate that the driver is not intoxicated. The intoxication indication module 424 may, however, not indicate that the driver is not intoxicated when one or more predetermined conditions are present indicative of uncertainty as to whether the amount of intoxicant measured is accurate.

When the amount of the intoxicant measured by the passive breath sensor 120 is greater than or equal to the predetermined amount, the intoxicant indication module 424 may determine and indicate that the driver is intoxicated under some circumstances. More specifically, when the amount of the intoxicant measured by the passive breath sensor 120 is greater than or equal to the predetermined amount and one or more of the other parameters indicate that the driver is intoxicated, the intoxication indication module 424 may determine and indicate that the driver is intoxicated.

For example (in addition to requiring that the amount is greater than or equal to the predetermined amount), the intoxication indication module 424 may determine and indicate that the driver is intoxicated when the heart rate of the driver is greater than the baseline heart rate of the driver by at least a predetermined amount. The predetermined amount may be, for example, approximately 10 percent of the baseline heart rate or another suitable value. In various implementations, the predetermined amount may be a number of beats per period of time (e.g., minute).

As another example (in addition to requiring that the amount is greater than or equal to the predetermined amount), the intoxication indication module 424 may determine and indicate that the driver is intoxicated when the breathing rate of the driver is greater than the baseline breathing rate of the driver by at least a predetermined amount. The predetermined amount may be, for example, approximately 10 percent of the baseline breathing rate or another suitable value. In various implementations, the predetermined amount may be a number of breaths per period of time (e.g., minute).

As another example (in addition to requiring that the amount is greater than or equal to the predetermined amount), the intoxication indication module 424 may determine and indicate that the driver is intoxicated when the body pose of the driver is different than the baseline body pose of the driver by at least a predetermined difference. This may indicate that the driver is, for example, slouching relative to his or her normal posture. The predetermined difference may be, for example, a predetermined distance per keypoint or another suitable metric.

As another example (in addition to requiring that the amount is greater than or equal to the predetermined amount), the intoxication indication module 424 may determine and indicate that the driver is intoxicated when the face pose of the driver is different than the baseline face pose of the driver by at least a predetermined difference. This may indicate that the driver's face is, for example, droopy (relaxed muscle tone) relative to his or her normal pose. The predetermined difference may be, for example, a predetermined distance per keypoint or another suitable metric.

As another example (in addition to requiring that the amount is greater than or equal to the predetermined amount), the intoxication indication module 424 may determine and indicate that the driver is intoxicated when the pupil diameter of the driver is greater than the baseline pupil diameter of the driver by at least a predetermined value. The predetermined may be, for example, approximately 10 percent of the baseline diameter or another suitable value. In various implementations, the predetermined value may be a distance.

While the above examples are discussed individually (in addition to requiring that the amount is greater than or equal to the predetermined amount), two or more of the examples above may be combined and required before indicating that the driver is intoxicated.

As another example regarding indicating that the driver is not intoxicated, (in addition to requiring that the amount be less than the predetermined amount), the intoxication indication module 424 may not indicate that the driver is not intoxicated when a second face is detected near (e.g., within a predetermined distance of the passive breath sensor 120). This may indicate that a user other than the driver is breathing into the passive breath sensor 120. The predetermined distance may be, for example, approximately 3 feet or another suitable distance.

As another example regarding indicating that the driver is not intoxicated, (in addition to requiring that the amount be less than the predetermined amount), the intoxication indication module 424 may not indicate that the driver is not intoxicated when a filter is detected in the mouth of the driver of the vehicle. The face detection module 408 may detect the presence of a filter in the mouth of the driver when a predetermined shape (e.g., a cylinder) is present in the ROI including the face of the driver. The face detection module 408 may detect the filter, for example, using an object or shape detection algorithm. The filter may include, for example, water, charcoal, or another medium configured to decrease the amount of the intoxicant output from the filter relative to breath input to the filter.

As another example regarding indicating that the driver is not intoxicated, (in addition to requiring that the amount be less than the predetermined amount), the intoxication indication module 424 may not indicate that the driver is not intoxicated when the parameter module 420 determines that the driver is not breathing (e.g., holding his or her breath/not exhaling). Drivers may do this, for example, in an attempt to minimize the amount of the intoxicant measured by the passive breath sensor 120.

One or more remedial actions may be taken when intoxication indication module 424 indicates that the driver is intoxicated. For example, a communication module 436 may wirelessly communicate an indicator that the driver is intoxicated via one or more antennas 440 to one or more remote devices, such as the remote device 130. The communication module 436 may communicate, for example, using cellular communication, WiFi communication, satellite communication, or in another suitable manner.

Additionally or alternatively, when the intoxication indication module 424 indicates that the driver is intoxicated, an output module 444 may output a visual and/or audible indicator within the passenger cabin that the driver is intoxicated via one or more output devices such as output device 448. Examples of output devices include lights, speakers, displays (e.g., touchscreen or non-touchscreen), and other types of visual and audible output devices.

Additionally or alternatively, when the intoxication indication module 424 indicates that the driver is intoxicated, an actuator control module 452 may actuate one or more actuators of the vehicle, such as actuator 456. The actuator control module 452 may, for example, prevent the vehicle from starting if the vehicle is off. The actuator control module 452 may, for example, slow the vehicle or limit a maximum speed of the vehicle to a predetermined speed if the vehicle if the vehicle is moving. If the vehicle is running and not moving, the actuator control module 452 may prevent the vehicle from moving (e.g., maintain a transmission in park). While examples are provided, the present application is also applicable to other actions.

Figure 5:
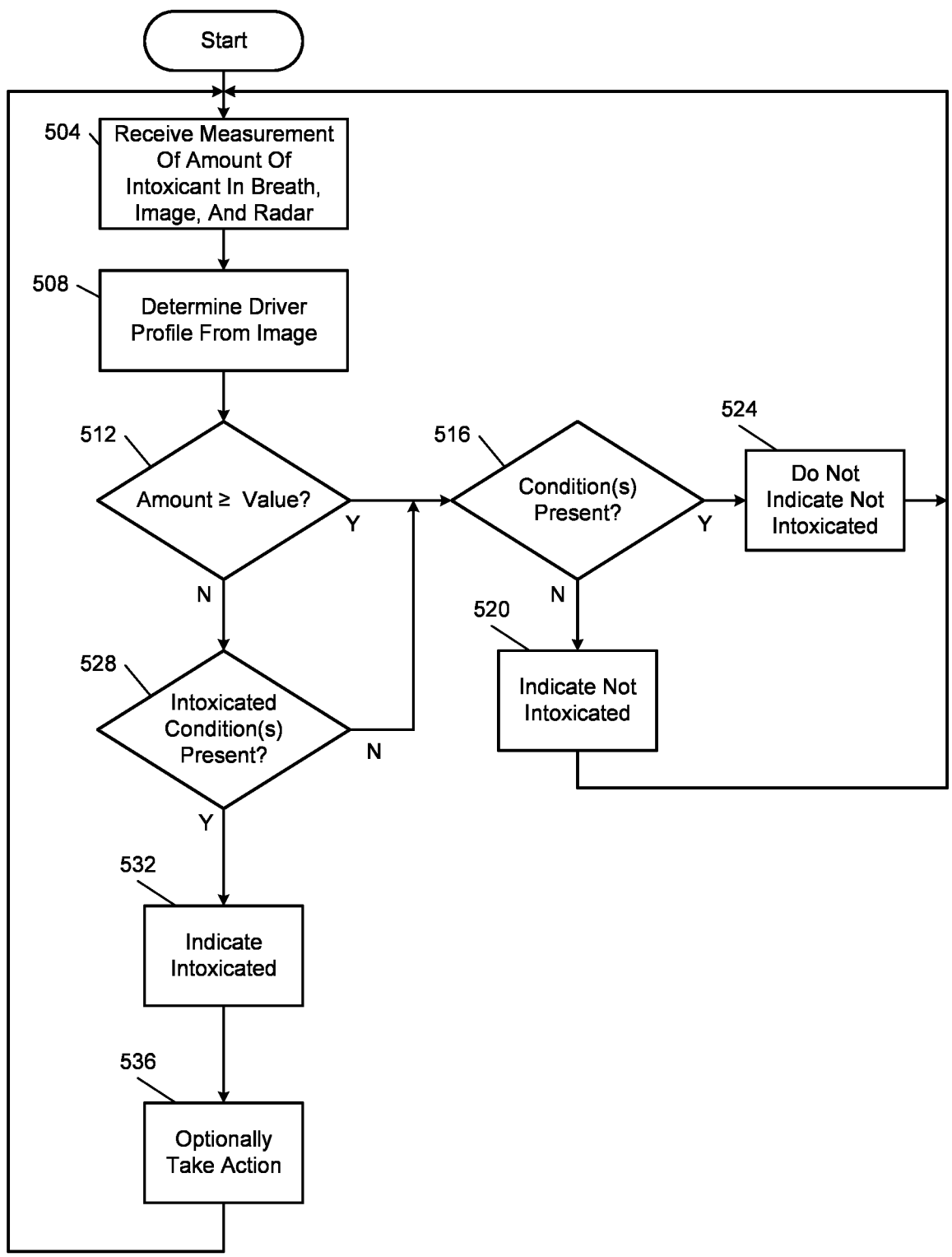
FIG. 5 is a flowchart depicting an example method of indicating whether or not a driver of a vehicle is intoxicated based on input from multiple input devices.

FIG. 5 is a flowchart depicting an example method of indicating whether or not a driver of a vehicle is intoxicated based on input from multiple input devices. Control begins with 504 where the intoxication module 124 receives the measurement from the passive breath sensor 120, the image from the camera 112, and the radar signals from the radar sensor 122.

At 508, the driver module 416 selects and indicates to the baseline module 428 the one of the profiles that has a face that most closely matches the face of the driver captured in the image from the camera 112. The baseline module 428 retrieves the baselines for the present driver.

At 512, the intoxication indication module 424 may determine whether the amount of the intoxicant measured by the passive breath sensor 120 is greater than or equal to the predetermined value (amount of the intoxicant). If 512 is true, control may continue with 528, which is discussed further below. If 512 is false, control may continue with 516.

At 516, the intoxication indication module 424 may determine whether one or more predetermined conditions are present for not indicating that the driver is not intoxicated. If 516 is false (all of the predetermined conditions are not present), the intoxication module 524 may indicate that the driver is not intoxicated at 520. If 516 is true (one or more of the predetermined conditions are present), the intoxication module 524 may not indicate that the driver is not intoxicated at 524. Examples of these predetermined conditions include, for example, the driver holding his or her breath, the presence of a second face within the predetermined distance of the passive breath sensor 120, and the driver including an object having a predetermined shape of a filter in his or her mouth.

At 528, the intoxication indication module 424 may determine whether one or more predetermined conditions are present for indicating that the driver is intoxicated. If 528 is false (e.g., none of the predetermined conditions are present), control may transfer to 516, the intoxication module 524 may indicate that the driver is intoxicated at 532. Examples of these predetermined conditions include the heart rate being greater than the baseline heart rate of the driver by at least the predetermined amount, the breathing rate of the driver being greater than the baseline breathing rate of the driver by at least the predetermined amount, the body pose of the driver being different than the baseline body pose of the driver by at least the predetermined difference, the face pose of the driver being different than the baseline face pose of the driver by at least the predetermined difference, the pupil diameter of the driver being greater than the baseline pupil diameter of the driver by at least the predetermined value, etc.

At 536, optionally one or more remedial actions may be taken, as described above. Control may return to 504 after 520, 524, or 536 to continuously monitor the driver for intoxication.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An intoxication detection system of a vehicle, comprising:
    a passive breath sensor configured to measure an amount of an intoxicant present within a passenger cabin of the vehicle;
    a camera configured to capture images including a driver on a driver's seat within the passenger cabin of the vehicle;
    a radar sensor configured to output radar signals toward the driver's seat and receive signals reflected back to the radar sensor;
    a baseline module configured to determine baseline parameters for the driver based on images from the camera and the signals received by the radar sensor; and
    an intoxication indication module configured to output an indicator that the driver is intoxicated when both (a) the amount of the intoxicant is greater than or equal to a predetermined amount of the intoxicant and (b) at least one present parameter of the driver is different than a respective one of the baseline parameters for the driver by at least a predetermined amount.

2. The intoxication detection system of claim 1 wherein the intoxication indication module is configured to output the indicator that the driver is intoxicated when both (a) the amount of the intoxicant is greater than or equal to the predetermined amount of the intoxicant and (b) a present heart rate of the driver is greater than a baseline heart rate for the driver by at least a predetermined amount.

3. The intoxication detection system of claim 2 further comprising a parameter module configured to determine the present heart rate of the driver based on the signals received by the radar sensor.

4. The intoxication detection system of claim 1 wherein the intoxication indication module is configured to output the indicator that the driver is intoxicated when both (a) the amount of the intoxicant is greater than or equal to the predetermined amount of the intoxicant and (b) a present breathing rate of the driver is greater than a baseline breathing rate for the driver by at least a predetermined amount.

5. The intoxication detection system of claim 4 further comprising a parameter module configured to determine the present breathing rate of the driver based on the signals received by the radar sensor.

6. The intoxication detection system of claim 1 wherein the intoxication indication module is configured to output the indicator that the driver is intoxicated when both (a) the amount of the intoxicant is greater than or equal to the predetermined amount of the intoxicant and (b) a present body pose of the driver is different than a baseline body pose for the driver by at least a predetermined difference.

7. The intoxication detection system of claim 6 further comprising a body detection module configured to determine the present body pose of the driver based on an image from the camera.

8. The intoxication detection system of claim 1 wherein the intoxication indication module is configured to output the indicator that the driver is intoxicated when both (a) the amount of the intoxicant is greater than or equal to the predetermined amount of the intoxicant and (b) a present pose of a face of the driver is different than a baseline face pose for the driver by at least a predetermined difference.

9. The intoxication detection system of claim 8 further comprising a face detection module configured to determine the present pose of the face of the driver based on an image from the camera.

10. The intoxication detection system of claim 1 wherein the intoxication indication module is configured to output the indicator that the driver is intoxicated when both (a) the amount of the intoxicant is greater than or equal to the predetermined amount of the intoxicant and (b) a present dimension of a pupil of an eye of the driver is greater than a baseline pupil dimension for the driver by at least a predetermined amount.

11. The intoxication detection system of claim 10 further comprising an eye detection module configured to determine the present dimension of the pupil of the eye of the driver based on an image from the camera.

12. The intoxication detection system of claim 1 wherein the baseline module is configured to selectively update the baseline parameters for the driver based on images from the camera and the signals received by the radar sensor when the amount of the intoxicant present within the passenger cabin of the vehicle measured by the passive breath sensor is zero.

13. The intoxication detection system of claim 1 wherein the passive breath sensor includes a non-dispersive infrared (NDIR) sensor.

14. The intoxication detection system of claim 1 wherein the intoxicant is alcohol.

15. The intoxication detection system of claim 1 wherein the intoxication indication module is further configured to selectively output an indicator that the driver is not intoxicated when both the amount of the intoxicant is less than the predetermined amount of the intoxicant.

16. The intoxication detection system of claim 1 wherein the intoxication indication module is configured to not output the indicator that the driver is not intoxicated when a second face is detected in an image from the camera within a predetermined distance of the passive breath sensor.

17. The intoxication detection system of claim 1 wherein the intoxication indication module is configured to not output the indicator that the driver is not intoxicated when an object having a predetermined shape is detected in a mouth of the driver in an image from the camera.

18. The intoxication detection system of claim 17 wherein the predetermined shape is cylindrical.

19. The intoxication detection system of claim 1 wherein the intoxication indication module is configured to not output the indicator that the driver is not intoxicated when the driver is determined to be holding his or her breath.

20. An intoxication detection method for a vehicle, comprising:
  by a passive breath sensor, measuring an amount of an intoxicant present within a passenger cabin of the vehicle;
  capturing images including a driver on a driver's seat within the passenger cabin of the vehicle using a camera;
  by a radar sensor, outputting radar signals toward the driver's seat and receiving signals reflected back to the radar sensor;
  determining parameters for the driver based on images from the camera and the signals received by the radar sensor; and
  outputting an indicator that the driver is intoxicated when both (a) the amount of the intoxicant is greater than or equal to a predetermined amount of the intoxicant and (b) at least one present parameter of the driver is different than a respective one of the parameters for the driver by at least a predetermined amount.

* * * * *